United States Patent
Chin et al.

(10) Patent No.: US 11,148,206 B2
(45) Date of Patent: Oct. 19, 2021

(54) MOLD LOCK REMEDIATION

(71) Applicant: Desktop Metal, Inc., Burlington, MA (US)

(72) Inventors: Ricardo Chin, Shrewsbury, MA (US); Blake Z. Reeves, Chelsea, MA (US)

(73) Assignee: Desktop Metal, Inc., Burlington, MA (US)

( * ) Notice: Subject to any disclaimer, the term of this patent is extended or adjusted under 35 U.S.C. 154(b) by 157 days.

(21) Appl. No.: 16/328,813

(22) PCT Filed: Apr. 23, 2018

(86) PCT No.: PCT/US2018/028870
§ 371 (c)(1),
(2) Date: Feb. 27, 2019

(87) PCT Pub. No.: WO2018/200382
PCT Pub. Date: Nov. 1, 2018

(65) Prior Publication Data
US 2019/0210109 A1 Jul. 11, 2019

Related U.S. Application Data

(60) Provisional application No. 62/580,966, filed on Nov. 2, 2017, provisional application No. 62/489,271, filed on Apr. 24, 2017.

(51) Int. Cl.
*G05B 19/4099* (2006.01)
*B33Y 50/00* (2015.01)
(Continued)

(52) U.S. Cl.
CPC .............. *B22F 10/20* (2021.01); *B28B 1/001* (2013.01); *B28B 17/0081* (2013.01);
(Continued)

(58) Field of Classification Search
None
See application file for complete search history.

(56) References Cited

U.S. PATENT DOCUMENTS

| | | | | |
|---|---|---|---|---|
| 2016/0023404 A1* | 1/2016 | Anderson | ............. | B29C 64/393 700/119 |
| 2017/0232671 A1* | 8/2017 | Fieldman | ............. | B29C 64/153 264/497 |
| 2018/0297287 A1* | 10/2018 | Dikovsky | ............. | B29C 64/188 |

FOREIGN PATENT DOCUMENTS

WO   WO-2017017941 A1 * 2/2017 ........... G03G 15/224

OTHER PUBLICATIONS

Rohan Vaidya and Sam Anand, Optimum Support Structure Generation for Additive Manufacturing using Unit Cell Structures and Support Removal Constraint, 2016, 44th Proceedings of the North American Manufacturing Research Institution of SME, vol. 5, 2016, pp. 1043-1059 (Year: 2016).*

(Continued)

*Primary Examiner* — Kenneth M Lo
*Assistant Examiner* — Istiaque Ahmed
(74) *Attorney, Agent, or Firm* — Oak Law, PLLC; Jonathan D. Hall

(57) ABSTRACT

Mold lock is remediated by performing a layer-by-layer, two-dimensional analysis to identify unconstrained removal paths for any support structure or material within each two-dimensional layer, and then ensuring that aligned draw paths are present for all adjacent layers, all as more specifically described herein. Where locking conditions are identified, a sequence of modification rules are then applied, such as by breaking support structures into multiple, independently removable pieces. By addressing mold lock as a series of interrelated two-dimensional geometric problems, and reserving three-dimensional remediation strategies for (Continued)

more challenging, complex mold lock conditions, substantial advantages can accrue in terms of computational speed and efficiency.

21 Claims, 5 Drawing Sheets

(51) Int. Cl.
| | |
|---|---|
| *B22F 10/20* | (2021.01) |
| *B33Y 50/02* | (2015.01) |
| *B28B 17/00* | (2006.01) |
| *B28B 1/00* | (2006.01) |
| *B29C 64/386* | (2017.01) |
| *B29C 64/40* | (2017.01) |
| *H04N 1/409* | (2006.01) |
| *B33Y 10/00* | (2015.01) |
| *B29C 64/10* | (2017.01) |
| *B22F 10/30* | (2021.01) |

(52) U.S. Cl.
CPC ............ *B29C 64/386* (2017.08); *B29C 64/40* (2017.08); *B33Y 50/00* (2014.12); *B33Y 50/02* (2014.12); *G05B 19/4099* (2013.01); *H04N 1/4092* (2013.01); *B22F 10/30* (2021.01); *B29C 64/10* (2017.08); *B33Y 10/00* (2014.12); *G05B 2219/35134* (2013.01); *G05B 2219/49007* (2013.01)

(56) References Cited

OTHER PUBLICATIONS

Das, P. et al. "Selection of build orientation for optimal support structures and minimum part errors in additive manufacturing." Computer-aided Design and Applications 14 (2017): 1-13. (Year: 2017).*

* cited by examiner

MOLD LOCK REMEDIATION

RELATED APPLICATIONS

This application claims priority to U.S. Prov. App. No. 62/580,966 filed on Nov. 2, 2017 and U.S. Prov. App. No. 62/489,271 filed on Apr. 24, 2017. The entire content of the foregoing applications is hereby incorporated by reference.

FIELD

This disclosure relates to three-dimensional fabrication, and more specifically to techniques for remediating mold lock in a three-dimensional fabrication process.

BACKGROUND

Mold lock occurs in three-dimensional printing when rigid support structures for a printed object are geometrically interlocked with the object in a manner that provides no physical draw path for removal of the supports. There remains a need for techniques that automatically identify and remediate mold lock conditions within three-dimensional models of printed objects.

SUMMARY

Mold lock is remediated by performing a layer-by-layer, two-dimensional analysis to identify unconstrained removal paths for any support structure or material within each two-dimensional layer, and then ensuring that aligned draw paths are present for all adjacent layers, all as more specifically described herein. Where locking conditions are identified, a sequence of modification rules are then applied, such as by breaking support structures into multiple, independently removable pieces. By addressing mold lock as a series of interrelated two-dimensional geometric problems, and reserving three-dimensional remediation strategies for more challenging, complex mold lock conditions, substantial advantages can accrue in terms of computational speed and efficiency.

In one aspect, a method disclosed herein may include receiving a digital model including a raft, an object for fabrication on the raft, and a support for fabrication with the object to provide physical support according to one or more design rules; dividing the digital model into a number of layers formed by planar, horizontal cross sections through the digital model; for each layer, identifying one or more draw paths for separating a layer of support formed by a cross section of the support from a layer of the object formed by a cross section of the object within the layer of the digital model; identifying one of the number of layers as a locked layer when the layer of support has no draw path for separating the layer of support from the layer of the object, or when the layer of support is vertically coupled to a second layer of the support having no draw path in common with the layer of support; identifying a mold locked region of the support including the locked layer and any vertically contiguous support layers; dividing the mold locked region with one or more vertical planes into one or more subregions; if the one or more subregions can be horizontally removed, processing a remaining digital model, excluding the one or more subregions, for mold lock remediation; and if the one or more subregions cannot be horizontally removed, employing one or more three-dimensional remediation strategies to address the mold locked region.

Dividing the mold locked region may include iteratively attempting an increasing number of planar slices until the one or more subregions can be horizontally removed or a threshold is reached. The one or more three-dimensional remediation strategies may include vertically moving the mold locked region after a second mold locked region is removed from a vertically adjacent volume. The one or more three-dimensional remediation strategies may include subdividing the mold locked region into a number of volumetric subregions and searching for three-dimensional draw paths for removing the volumetric subregions from the object. The volumetric subregions may be sized for removal through an opening in the object. The method may further include, if the one or more three-dimensional remediation strategies fail to remediate the mold lock, providing a notification to a user of an unremediated mold lock condition. The draw path may include a range of angles over which a first rigid shape of the cross section of the support can be separated in a straight line from a second rigid shape of the object. Identifying one or more draw paths may include testing for linear separation in a straight line at a number of discrete angles over a predetermined range of angles. The method may further include performing an initial check to determine whether the object can be separated from the support along a vertical axis. The method may further include separating regions of the support touching the raft from regions of the support not touching the raft along a vertical axis and performing a check to determine whether the object can be separated from the support along the vertical axis. The method may further include fabricating the object and the support based on the digital model. Fabricating the object and the support may include fabricating an interface layer between the one or more subregions of the mold locked region. Fabricating the object and the support may include fabricating an interface layer between the support and the object. The design rules may include fabrication design rules. The design rules may include sintering design rules. The number of layers may correspond to material deposition layers for an additive fabrication process.

In one aspect, a computer program product disclosed herein may include computer executable code embodied in a non-transitory computer readable medium that, when executing on one or more computing devices, performs the steps of receiving a digital model including a raft, an object for fabrication on the raft, and a support for fabrication with the object to provide physical support according to one or more design rules; dividing the digital model into a number of layers formed by planar, horizontal cross sections through the digital model; for each layer, identifying one or more draw paths for separating a layer of support formed by a cross section of the support from a layer of the object formed by a cross section of the object within the layer of the digital model; identifying one of the number of layers as a locked layer when the layer of support has no draw path for separating the layer of support from the layer of the object, or when the layer of support is vertically coupled to a second layer of the support having no draw path in common with the layer of support; identifying a mold locked region of the support including the locked layer and any vertically contiguous support layers; dividing the mold locked region with one or more vertical planes into one or more subregions; if the one or more subregions can be horizontally removed, processing a remaining digital model, excluding the one or more subregions, for mold lock remediation; and if the one or more subregions cannot be horizontally removed, employing one or more three-dimensional remediation strategies to address the mold locked region.

The computer program product may further include code that performs the step of performing an initial check to determine whether the object can be separated from the support along a vertical axis. The computer program product may further include code that performs the step of separating regions of the support touching the raft from regions of the support not touching the raft along a vertical axis and performing a check to determine whether the object can be separated from the support along the vertical axis. The computer program product may further include code that generates instructions executable by a three-dimensional printer to fabricate the object and the support, including fabricating an interface layer between the object and the support and a second interface layer between the one or more subregions of the mold locked region.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DESCRIPTION

Embodiments will now be described with reference to the accompanying figures. The foregoing may, however, be embodied in many different forms and should not be construed as limited to the illustrated embodiments set forth herein.

All documents mentioned herein are incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "top," "bottom," "up," "down," "above," "below" and the like, are words of convenience and are not to be construed as limiting terms unless specifically stated to the contrary.

Figure 1:
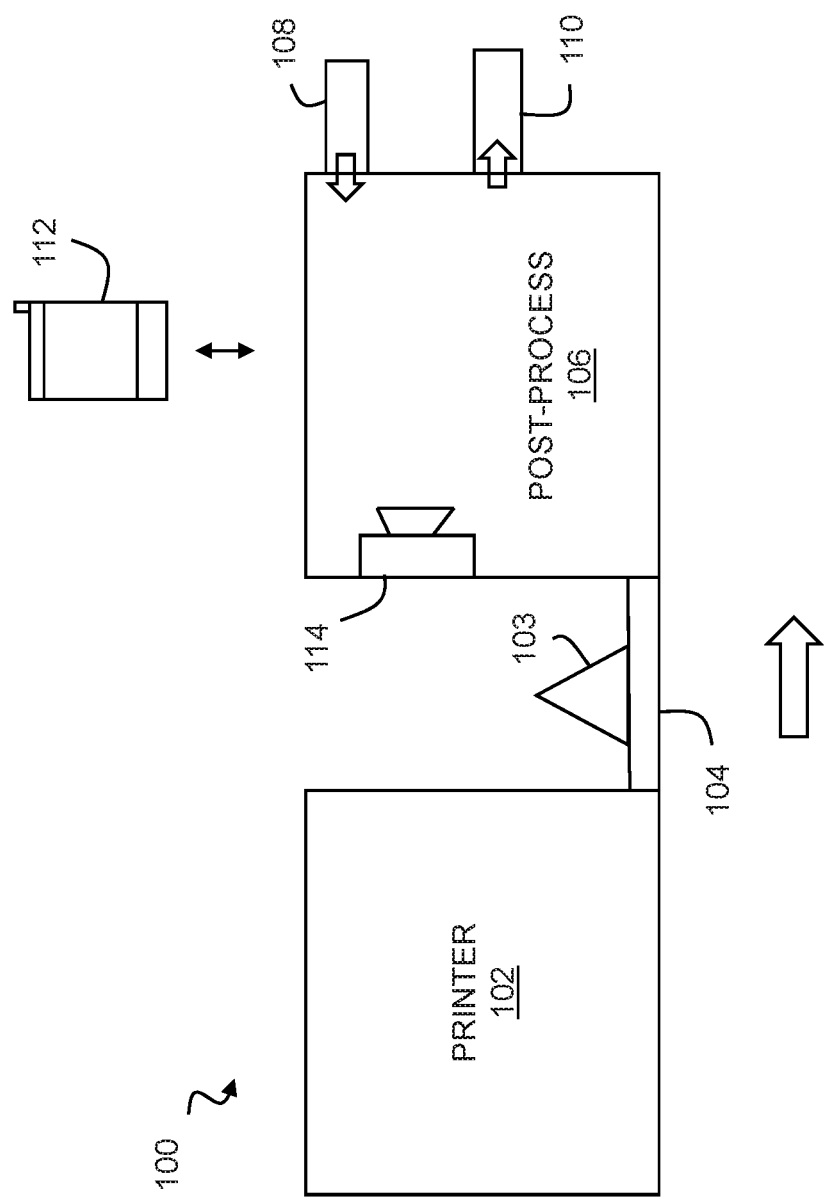
FIG. 1 shows an additive manufacturing system.

FIG. 1 shows an additive manufacturing system for use with sinterable build materials. The system 100 may include a printer 102, a conveyor 104, and a post-processing station 106.

In general, the printer 102 may be any of the printers described herein or any other three-dimensional printer suitable for adaptation to fabrication with sinterable build materials. By way of non-limiting example, the printer 102 may include a fused filament fabrication system, a binder jetting system, a stereolithography system, a selective laser sintering system, or any other system that can be usefully adapted to form a net shape object under computer control using the sinterable build materials contemplated herein.

The output of the printer 102 may be an object 103 that is a green body or the like formed of a build material including any suitable powder (e.g., metal, metal alloy, ceramic, and so forth, as well as combinations of the foregoing), along with a binder that retains the powder in a net shape produced by the printer 102. A wide range of compositions may be employed as the build material contemplated herein. For example, powdered metallurgy materials or the like may be adapted for use as a build material in a fused filament fabrication process or the like. Metal injection molding materials with suitable thermo-mechanical properties for extrusion in a fused filament fabrication process are described by way of non-limiting example in Heaney, Donald F., ed. "Handbook of Metal Injection Molding" (2012), the entire contents of which are hereby incorporated by reference.

The conveyor 104 may be used to transport the object 103 from the printer 102 to a post-processing station 106, which may include one or more separate processing stations, where debinding and sintering can be performed. The conveyor 104 may be any suitable mechanism or combination of devices suitable for physically transporting the object 103. This may, for example, include robotics and a machine vision system or the like on the printer side for detaching the object 103 from a build platform, as well as robotics and a machine vision system or the like on the post-processing side to accurately place the object 103 within the post-processing station 106. In another aspect, the post-processing station 106 may serve multiple printers so that a number of objects can be debound and sintered concurrently, and the conveyor 104 may interconnect the printers and post-processing station so that multiple print jobs can be coordinated and automatically completed in parallel. In another aspect, the object 103 may be manually transported between the two corresponding stations.

The post-processing station 106 may be any system or combination of systems useful for converting a green part formed into a desired net shape from a metal injection molding build material by the printer 102 into a final object. The post-processing station 106 may, for example, include a debinding station such as a chemical debinding station for dissolving binder materials in a solvent or the like, or more generally any debinding station configured to remove at least a portion of the binder system from the build material of the object 103. The post-processing station 106 may also or instead include a thermal sintering station for applying a thermal sintering cycle at a sintering temperature for the build material, or the powdered material in the build material, such as a sintering furnace configured to sinter the powdered material into a densified object. The components of the post-processing station 106 may be used in sequence to produce a final object. As another example, some contemporary injection molding materials are engineered for thermal debinding, which makes it possible to perform a combination of debinding and sintering steps with a single oven or similar device. In general, the thermal specifications of a sintering furnace will depend upon the powdered material, the binder system, the volume loading of the powdered material into the binder system, and other aspects of the green object and the materials used to manufacture same. Commercially available sintering furnaces for thermally debound and sintered metal injection molding (MIM) parts will typically operate with an accuracy of +/−5 degrees Celsius or better, and at temperatures of at least 600 degrees Celsius, or from about 200 degrees Celsius to about 1900 degrees Celsius for extended times. Any such furnace or similar heating device may be usefully employed as the post-processing station 106 as contemplated herein. Vacuum or pressure treatment may also or instead be used. In an aspect, after the object 103 is placed in the oven, beads of an identical or similar composition, with the addition of an unsinterable exterior coating, may be packed into the oven with the object to provide general mechanical support with a thermally matched shrinkage rate that will not form a bond to the object during sintering.

In the context of this description, it will be appreciated that sintering may usefully include different types of sintering. For example, sintering may include the application of heat to sinter an object to full density or nearly full density. In another aspect, sintering may include partial sintering, e.g., for a sintering and infiltration process in which pores of a partially sintered part are filled, e.g., through contact and capillary action, with some other material such as a low melting point metal to increase hardness, increase tensile strength, or otherwise alter or improve properties of a final part. Thus, any references herein to sintering should be understood to contemplate sintering and infiltration unless a different meaning is expressly stated or otherwise clear from the context. Similarly, references to a sinterable powder or sinterable build material should be understood to contemplate any sinterable material including powders that can be sintered and infiltrated to form a final part.

It will also be appreciated that a wide range of other debinding and sintering processes can be used. For example, the binder may be removed in a chemical debind, thermal debind, or some combination of these. Other debinding processes are also known in the art, such as supercritical debinding or catalytic debinding, any of which may also or instead be employed by the post-processing station 106. For example, in a common process, a green part is first debound using a chemical debind, which is following by a thermal debind at a moderately high temperature (in this context, around 700-800 Celsius) to remove organic binder and create enough necks among a powdered material to provide sufficient strength for handling. From this stage, the object may be moved to a sintering furnace to remove any remaining components of a binder system and densify the object into a final part. In another aspect, a pure thermal debind may be used to remove the organic binder. More generally, any technique or combination of techniques may be usefully employed to debind an object as contemplated herein.

The post-processing station 106 may be optimized in a variety of ways for use in an office environment. In one aspect, the post-processing station 106 may include an inert gas source 108. The inert gas source 108 may, for example, include argon or other inert gas (or other gas that is inert to the sintered material), and may be housed in a removable and replaceable cartridge that can be coupled to the post-processing station 106 for discharge into the interior of the post-processing station 106, and then removed and replaced when the contents are exhausted. The post-processing station 106 may also or instead include a filter 110 such as a charcoal filter or the like for exhausting gasses that can be outgassed into an office environment in an unfiltered form. For other gasses, an exterior exhaust, or a gas container or the like may be provided to permit use in unventilated areas. For reclaimable materials, a closed system may also or instead be used, particularly where the environmental materials are expensive or dangerous.

In one aspect, the post-processing station 106 may be coupled to other system components. For example, the post-processing station 106 may include information from the printer 102, or from a controller for the printer, about the geometry, size, mass, and other physical characteristics of the object 103 in order to generate a suitable debinding and sintering profile. In another aspect, the profile may be independently created by the controller or other resource and transmitted to the post-processing station 106 when the object 103 is conveyed. In another aspect, the post-processing station 106 may monitor the debinding and sintering process and provide feedback, e.g., to a smart phone or other remote device 112, about a status of the object 103, a time to completion, and other processing metrics and information. The post-processing station 106 may include a camera 114 or other monitoring device to provide feedback to the remote device 112, and may provide time lapse animation or the like to graphically show sintering on a compressed time scale. Post-processing may also or instead include finishing with heat, a hot knife, tools, or similar. Post-processing may include applying a finish coat.

In another aspect, the post-processing station 106 may be remote from the printer 102, e.g., in a service bureau model or the like where the object 103 is fabricated and then sent to a service bureau for outsourced debinding, sintering and so forth. Thus, for any of the support structures, interface layers, and so forth described below, or more generally, for any fabricated items described below, this disclosure expressly contemplates a corresponding method of receiving an object or item containing any such features, e.g., any features or structures described below, and then performing one or more post-processing steps including but not limited to shaping, debinding, sintering, finishing, assembly, and so forth. This may, for example, include receiving a green part with a fully intact binder system, at a remote processing resource, where the part can be debound and sintered at the remote processing resource. This may also or instead include receiving a brown part where some or all of the binder system has been removed in a debinding process at another location and the part is only sintered at the remote processing resource. In this latter case, a portion of the binder system may usefully be retained in the part, either as a backbone binder to retain a shape of the object during sintering until a self-supporting sintering strength is achieved, or as a residual primary binder that is left in the part to improve structural integrity during shipping or other handling.

More generally, this disclosure contemplates any combination and distribution of steps suitable for centralized or distributed processing into a final part, as well as any intermediate forms of the materials, articles of manufacture, and assemblies that might be used therein.

Figure 2:
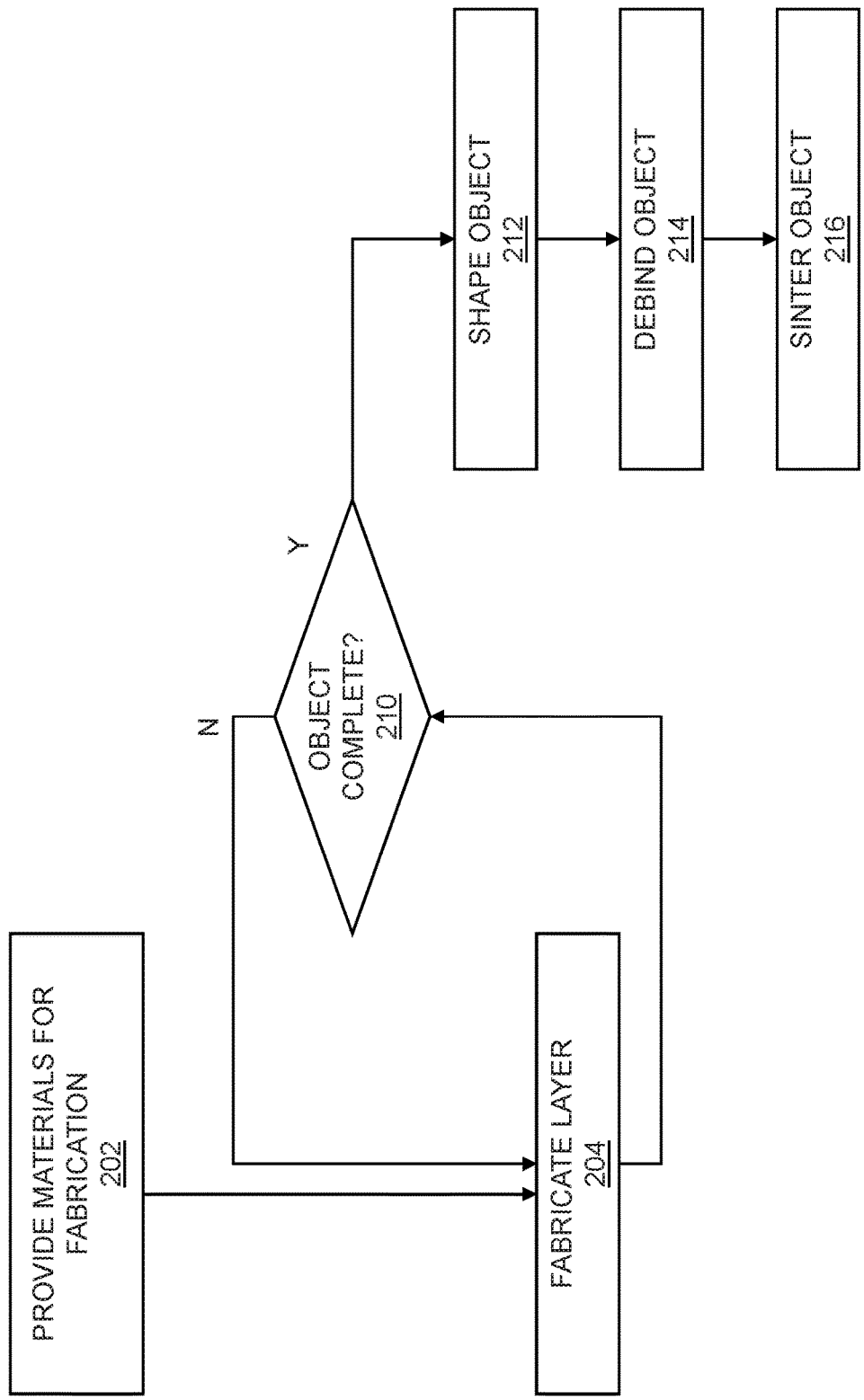
FIG. 2 shows a method for fabricating an object.

FIG. 2 shows a method for fabricating an object. The method 200 is more specifically a generalized method for layer-by-layer fabrication of an object using sinterable materials.

As shown in step 202, the method 200 may begin with providing a material for fabrication. This may include any of a variety of materials that can be usefully handled in a layer-based fabrication process such as fused filament fabrication, binder jetting, stereolithography, and so forth. For example, this may include sinterable powders of metal, which may be bound together using a binder system or the like to retain a net shape of an object during printing and subsequent processing into a final object. Interface layers of unsinterable materials, or materials that otherwise resist bonding of an object to an adjacent support material, may be used to fabricate a separation layer for easily removable support structures. A number of suitable materials are described, for example, in U.S. Pat. No. 9,833,839 (incorporated herein by reference), any of which may be used for the fabrication of an object, supports and interface layers as contemplated herein. More generally, any material(s) suitable for use fabricating objects, supports and interface layers in a layer-based fabrication system may be employed as the materials in this method 200. It will further be appreciated that other techniques that are not layer based, including subtractive techniques such as milling or fluid jetting, may also or instead be used, and any correspondingly suitable materials may also or instead be employed as a build material for fabricating an object.

Furthermore, additional materials may be employed by a fabrication system, such as support materials, interface layers, finishing materials (for exterior surfaces of an object) and so forth, any of which may be used as a material for fabrication in the systems and methods contemplated herein.

As shown in step 204, the method may include fabricating a layer for an object. This may, for example, include a layer of the object itself or a layer of a support structure. For a particular layer (e.g., at a particular z-axis position of a fabrication system), an interface layer may also or instead be fabricated to provide a non-sinterable interface or similar release layer or structure between a support structure (or a substrate such as a raft, setter, or print bed) and an object. In another aspect, finishing materials for exterior surfaces may be used, such as materials that impart desired aesthetic, structural, or functional properties to surfaces of the object.

As shown in step 210, a determination may be made whether the object (and related supports, etc.) is complete. If the object is not complete, the method 200 may return to step 204 and another layer may be fabricated. If the object is complete, then the method 200 may proceed to step 212 where post-processing begins.

As shown in step 212, the method 200 may include shaping the object. Prior to debinding and sintering, an object is typically in a softer, more workable state. While this so-called green part is potentially fragile and subject to fracturing or the like, the more workable state affords a good opportunity for surface finishing, e.g., by sanding or otherwise smoothing away striations or other artifacts of the layer-based fabrication process, as well as spurs, burrs and other surface defects that deviate from a computerized model of an intended shape of the object. In this context, shaping may include manual shaping, or automated shaping using, e.g., a computerized milling machine, grinding tools, or a variety of brushes, abrasives and so forth or any other generally subtractive technique or tool(s). In one aspect, a fluid stream of a gas such as carbon dioxide may be used to carry dry ice particulates to smooth or otherwise shape a surface. In this latter approach, the abrasive (dry ice) can conveniently change phase directly to a gas under normal conditions, thus mitigating cleanup of abrasives after shaping the object.

As shown in step 214, the process 200 may include debinding the printed object. In general, debinding may remove some or all of a binder or binder system that retains a build material containing a metal (or ceramic or other) powder in a net shape that was imparted by the printer. Numerous debinding techniques, and corresponding binder systems, are known in the art and may be used as binders in the build materials contemplated herein. By way of non-limiting examples, the debinding techniques may include thermal debinding, chemical debinding, catalytic debinding, supercritical debinding, evaporation and so forth. In one aspect, injection molding materials may be used. For example, some injection molding materials with rheological properties suitable for use in a fused filament fabrication process are engineered for thermal debinding, which advantageously permits debinding and sintering to be performed in a single baking operation, or in two similar baking operations. In another aspect, many binder systems may be quickly and usefully removed in a debinding process by microwaving an object in a microwave oven or otherwise applying energy that selectively removes binder system from a green part. With a suitably adapted debinding process, the binder system may include a single binder, such as a binder that is removable through a pure thermal debind.

More generally, the debinding process removes a binder or binder system from a net shape green object, thus leaving a dense structure of metal (or ceramic or other) particles, generally referred to as a brown part, that can be sintered into the final form. Any materials and techniques suitable for such a process may also or instead be employed for debinding as contemplated herein.

As shown in step 216, the process 200 may include sintering the printed and debound object into a final form. In general, sintering may include any process of densifying and forming a solid mass of material by heating without liquefaction. During a sintering process, necks form between discrete particles of a material, and atoms can diffuse across particle boundaries to fuse into a solid piece. Because sintering can be performed at temperatures below the melting temperature, this advantageously permits fabrication with very high melting point materials such as tungsten and molybdenum.

Numerous sintering techniques are known in the art, and the selection of a particular technique may depend upon the build material used, the size and composition of particles in a material and the desired structural, functional or aesthetic result for the fabricated object. For example, in solid-state (non-activated) sintering, metal powder particles are heated to form connections (or "necks") where they are in contact. Over a thermal sintering cycle, these necks can thicken and create a dense part, leaving small, interstitial voids that can be closed, e.g., by hot isostatic pressing (HIP) or similar processes. Other techniques may also or instead be employed. For example, solid state activated sintering uses a film between powder particles to improve mobility of atoms between particles and accelerate the formation and thickening of necks. As another example, liquid phase sintering may be used, in which a liquid forms around metal particles. This can improve diffusion and joining between particles, but also may leave lower-melting phase within the sintered object that impairs structural integrity.

It will be understood that debinding and sintering result in material loss and compaction, and the resulting object may be significantly smaller than the printed object. However, these effects are generally linear in the aggregate, and net shape objects can be usefully scaled up when printing to create a shape with predictable dimensions after debinding and sintering. Additionally, as noted above, it should be appreciated that the method 200 may include sending a fabricated object to a processing facility such as a service bureau or other remote or outsourced facility, and the method 200 may also or instead include receiving the fabricated object at the processing facility and performing any one or more of the post-fabrication steps described above such as the shaping of step 212, the debinding of step 214, or the sintering of step 216.

Figure 3:
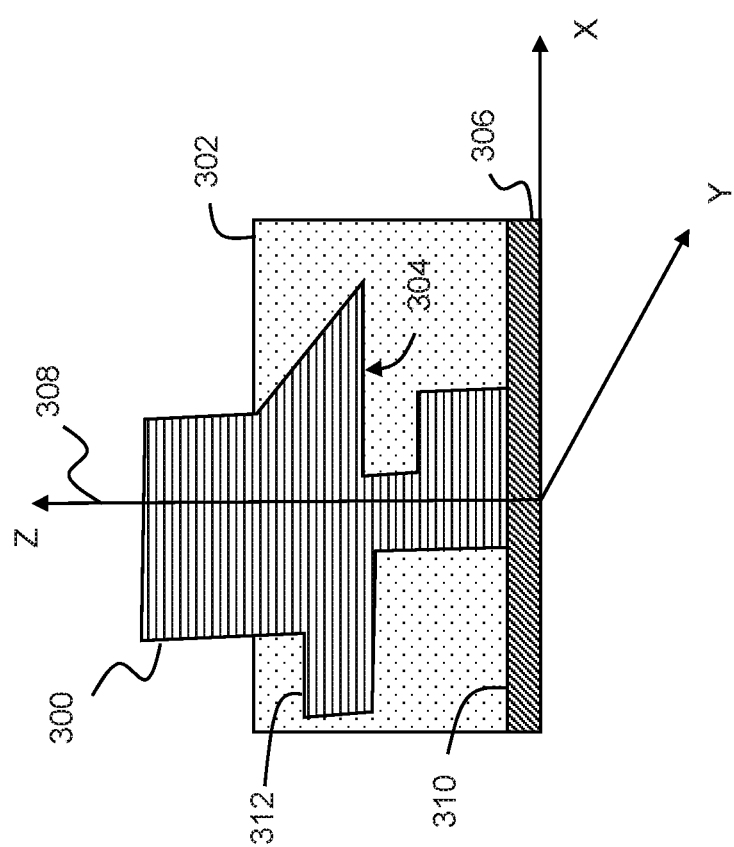
FIG. 3 shows a mold lock condition in a fabricated object.

FIG. 3 shows a mold lock condition. In general, an object 300 may be three-dimensionally printed using any of a variety of fabrication techniques such as any of the techniques described herein. Where necessary or helpful for fabrication, a support 302 may be fabricated adjacent to the object 300 to provide support for the object 300 during fabrication and/or subsequent handling. An interface layer 304 may be fabricated between the object 300 and the support 302 in order to prevent undesired bonding of the object 300 to the support 302, however for certain geometries the support 302 may enclose the object 300 in a manner that does not provide any path for removal of the object 300 from the support 302.

In a typical fabrication process, a raft 306 may also be fabricated as a substrate to receive the object 300 and support 302 during printing, and fabrication may be performed vertically along a vertical axis 308, often referred to as the z-axis, in a layer-by-layer fashion to render a physical realization of the object 300 above the raft 306. Some surfaces 310 of the support 302 may touch the raft 306, i.e., vertically project downward into contact with the raft 306, and other regions 312 of the support 302 may not touch the raft 306, i.e., vertically project downward into contact with the object 300 rather than the raft 306. As discussed below, an automated mold lock remediation process may address these regions differently.

Where the object 300 and support 302 are, e.g., sintered or otherwise thermally processed into substantially solid metal pieces or the like, removal of the support 302 can impose substantial post-fabrication processing in order to liberate the object 300 from the support 302, particularly where the geometry of the support 302 has no linear draw path for separation from the object 300, a condition referred to generally herein as mold lock. While the three-dimensional model for the support 302 may be modified prior to fabrication, e.g., in a computer aided design environment or the like, in order to break the support 302 into a number of sub-components that can be disassembled from around the object 300 after solidification, this is typically a labor-intensive process that is often performed manually. As described below, these challenges may be mitigated by providing automated remediation of mold lock conditions.

Figure 4:
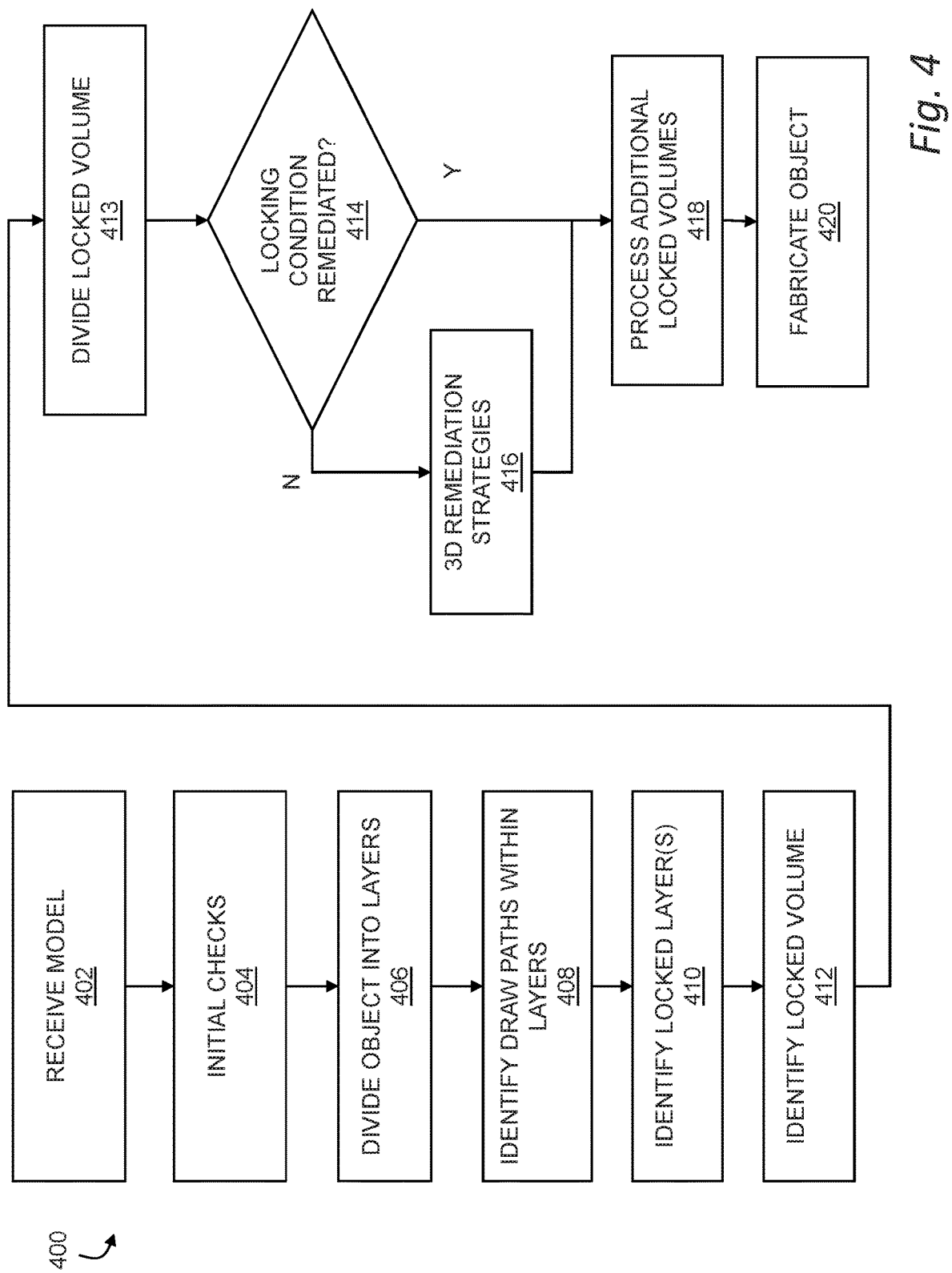
FIG. 4 shows a flow chart of a method for remediating mold lock conditions.

FIG. 4 shows a flow chart of a method for remediating mold lock conditions. In general, when supports are generated for a part, they may undergo a number of preliminary checks and simple modifications, followed by a systematic, two-dimensional strategy for detection and remediation of mold lock conditions. If these efforts fail, then a number of three-dimensional remediation strategies may be employed, followed by a notification to a user if mold lock conditions defy automated resolution. In addition to providing a number of simplified two-dimensional computational strategies for mold lock remediation, the method 400 described below may advantageously stage remediation strategies so that more computationally complex, three-dimensional remediation strategies are deferred until other strategies have proven unsuccessful.

As shown in step 402, the method 400 may include receiving a digital model of an object and a support structure. Receiving the model may include receiving the model within a computer aided design environment with a user interface for user interaction, or receiving the model by a tool or other program or environment configured to automate mold lock remediation as contemplated herein. In general, the model may include a model of any object suitable for fabrication along with support structures to physically support the object during fabrication. In general, support structures may be automatically positioned according to design rules for a particular fabrication process. The design rules may include fabrication design rules that implicitly or explicitly specify where support is needed, e.g., to support bridges or overhangs in an object during printing. The design rules may also or instead include sintering design rules that similarly specify where support is needed to prevent deformation or breakage of an object during sintering.

As noted above, during fabrication, an interface layer may be applied between surfaces of the model and the support in order to prevent coupling of the two surfaces during fabrication. As more generally described above, the digital model may include a raft, an object for fabrication on the raft, and a support for fabrication with the object to provide physical support according to one or more design rules, as well as an interface layer between any of the foregoing.

As shown in step 404, the method 400 may include performing a number of initial checks on the model to determine whether mold lock remediation is required. In one aspect, this may include performing an initial check to determine whether the object can be separated from the support along a vertical axis. While the current techniques favor two-dimensional processing for purposes of computational speed and simplicity, a preliminary check may be performed on the aggregate, three-dimensional structure of the object and support to determine whether the object can be simply removed, e.g., through a straight vertical motion, from the support, thus obviating further mold lock mitigation.

In another aspect, this may include a number of simple geometric attempts to address mold lock. For example, this may include separating regions of the support touching the raft (and a volume vertically above and contiguous with such regions) from regions of the support not touching the raft along a vertical axis and performing a check to determine whether the object can be separated from the modified structures of the support along the vertical axis. In general, this seeks to determine whether mold lock is being created by horizontal shelves that can be addressed by simply decoupling regions below the shelf from other regions of the support structure.

Once preliminary checks based on, e.g., vertical three-dimensional draw paths, are complete, the method 400 may proceed to other mold lock remediation steps as necessary.

As shown in step 406, the method 400 may include dividing the model into a number of layers for processing. This may, for example, include layers formed by planar, horizontal cross sections through the digital model. In one aspect, the number of layers may correspond to material deposition layers for an additive fabrication process. Using the physical deposition layers may significantly simplify processing where a current, fabrication-ready model or the like is already realized in a number of layers such as layers corresponding to stereolithography cross sections or fused filament fabrication tool paths.

As shown in step 408, the method 400 may include identifying draw paths for removing support from the object on a layer by layer basis within the layers of the digital model. This may include, for each layer of the digital model created above, identifying one or more draw paths for separating a layer of support formed by a cross section of the support from a layer of the object formed by a cross section of the object within the layer of the digital model. The draw path, may for example, include a range of angles over which a first rigid shape of the cross section of the support can be separated in a straight line from a second rigid shape of the object, or any other single linear path or range of compound paths suitable for uncoupling rigid two-dimensional shapes within a plane. Identifying the one or more draw paths may also or instead include testing for linear separation in a straight line at a number of discrete angles over a predetermined range of angles, or over a continuous range of angles, or any other similar strategy for systematically testing linear draw paths.

As shown in step 410, the method 400 may include identifying locked layers, e.g., layers of support with geometric features that prevent decoupling from layers of the object within the plane. In one aspect, this may include identifying one of the number of layers as a locked layer when the layer of support has no draw path for separating the layer of support from the layer of the object. This may also or instead include identifying one of the number of layers as a locked layer when the layer of support is vertically coupled to a second layer of the support having no draw path in common with the layer of support.

In one aspect, this may include a progressive search strategy for available draw paths. For example, a layer of support, or more specifically, the two-dimensional shape of the layer in a plane, may be checked in eight directions (e.g., two directions along four axes) for possible movement relative to the two-dimensional shape of the object in that plane. If a draw path is identified, other interstitial directions may also be checked, e.g., at half intervals to the originally checked directions. So, for example, where four axes are initially checked and a draw path is identified for one of the axes, the method 400 may include checking at 22.50-degree angles about the axis of the identified draw path.

As shown in step 412, the method 400 may include identifying locked volumes based on the locked layers. In general, this may include vertically traversing the layers of object and support to identify contiguous layers of support that cannot, as a group vertically separate from the object. In one aspect, this includes identifying a mold locked region of the support including one of the locked layers of support identified in step 410, along with any vertically contiguous support layers that collectively form a locked volume.

This may also include traversing upward and/or downward from a locked layer until a movable layer is identified. The intervening collection of layers, all of which are collectively locked, may then be sliced horizontally to separate them from other groups of layers, and these horizontal slices may, for example, be flagged for other three-dimensional strategies as discussed herein. In one aspect, additional steps may be taken to prevent piecemeal, layerwise processing. For example, where a single layer (or small number of adjacent layers) is removable, but positioned immediately adjacent to two locked layers, the removable layer may be associated with one or both of the locked layers in order to avoid separately fabricating a single, removable support layer. In this process, groups of movable layers may also be formed, e.g., so that a group of adjacent layers share at least one common draw path for horizontal removal. These groups may be horizontally separated from one another for independent, horizontal removal.

As shown in step 413, the method 400 may include dividing the locked volume of the mold locked region to attempt removal as smaller, separate pieces. This may, for example, include dividing the locked volume into one or more subregions with one or more vertical planes through the locked volume. This may also or instead include iteratively attempting an increasing number of planar slices until the one or more subregions can be horizontally removed or a threshold is reached. While this planar slicing strategy may be deployed in a deterministic manner (e.g., bisect, and then bisect again), other strategies may also or instead be employed. For example, planar slices may be positioned based on information about the aggregated draw paths for individual layers of the locked volume. In another aspect, the planar slices may be selected and arranged to address regularly occurring use cases. For example, two planes intersecting at or near a centroid of the locked volume will provide removable support structures for annular or toroidal shapes, and relieve a number of other polygonal, two-dimensional locking conditions.

As shown in step 414, the method 400 may include evaluating the resulting structure including the subregions of support structure to determine whether the mold lock condition has been remediated. This may, for example, include attempting horizontal removal of the subregions of the support from the object. If the one or more subregions can be removed (e.g., horizontally removed), then the method 400 may proceed to step 418 for processing of the remaining digital model. If the one or more subregions cannot be removed, then the method 400 may proceed to step 416 for further processing of the locked volume.

As shown in step 416, if the one or more subregions cannot be horizontally removed, the method 400 may include employing one or more three-dimensional remediation strategies to address the mold locked region. In one aspect, the three-dimensional remediation strategies may include vertically moving the mold locked region after a second mold locked region is removed from a vertically adjacent volume. That is, when a portion of substrate such as a raft, or any other volume of support material within the digital model, is vertically removed, this may expose regions of support that were previously horizontally enclosed, but can be removed vertically, such as supports within the center of a cylinder. In this case, it may be useful to check whether the separation of a region of support (e.g., using an interface layer that permits the region to be removed after fabrication) exposes such support structures for non-vertical movement. Where some vertical motion is possible but the mold locked region still cannot be extricated from an object after vertical travel, one or more horizontal slices through the mold locked region may usefully be employed to permit the mold locked region to be removed in a series of horizontal segments that individually travel vertically and then horizontally out of engagement with the object.

In another aspect, the three-dimensional remediation strategies may include subdividing the mold locked region into a number of volumetric subregions and searching for three-dimensional draw paths for removing the volumetric subregions from the object. In this approach, a mold locked region is simply subdivided into smaller volume pieces in order to attempt removal. The volumetric subregions may, for example, be sized for removal through an opening in the object. More generally, any regular or irregular pattern, such as a vertical and/or a horizontal grid pattern, may be applied to the mold locked region of support material to attempt extraction of individual volumetric subregions.

Other strategies may also or instead be employed. For example, for internal support structures traversing diagonally upward through an object, it may be necessary to identify layer-to-layer overlaps so that sufficient clearance can be added to the interface layer for travel of the entire support at an off-vertical angle during removal. In another aspect, features such as holes or openings to interior spaces may be usefully located and characterized using a number of three-dimensional processing techniques, and enclosed support may be subdivided into shapes that can be removed through such openings. These and other techniques may be used in any of a variety of combinations to identify and facilitate removal of support structures within a three-dimensional object. While some such techniques are known in the art, the method 400 described herein advantageously defers many of these more computationally complex processing challenges, known or otherwise, until various two-dimensional techniques have been applied to existing supports.

In the event that these and other three-dimensional remediation strategies fail to achieve a remediation of a mold lock condition, the method 400 may include providing a notification to a user of the unremediated mold lock condition. This may include a notification within a computer aided design application, an electronic communication sent through other media, or some combination of these or the like. Regions of unremediated mold lock may usefully be flagged or visually highlighted within a user interface to facilitate manual inspection and remediation as appropriate. After completion of three-dimensional remediation strategies and any other related processing steps, the method 400 may proceed to step 418 where additional volumes may be processed.

As shown in step 418, the method 400 may include processing a remaining digital model, e.g., a digital model excluding the one or more subregions of the support that have been unlocked from the object as described above, for mold lock remediation. Thus, the remediation steps may be repeated as needed to ensure that all of the potentially mold locked support structures are addressed prior to fabrication.

As shown in step 420, the method 400 may include fabricating the object and the support from the digital model, as well as the interface layers positioned between the object and support for disassembly and removal of the support structure from the object after fabrication. For volumes of support that have been subdivided as generally described herein, fabricating may similarly include fabricating an interface layer between the one or more subregions of a mold locked region so that the subregions can be disassembled after fabrication. In another aspect, fabricating the object (and support) may include generating instructions executable by a three-dimensional printer to fabricate the object and the support, including fabricating an interface layer between the object and the support. This may also or instead include generating instructions to fabricate a second interface layer between one or more subregions of a mold locked region, such as any of the subregions described above. Suitable instructions may be created, e.g., for any of a number of types of printers including fused filament fabrication printers, stereolithography printers, binder jet printers, and so forth.

Figure 5:
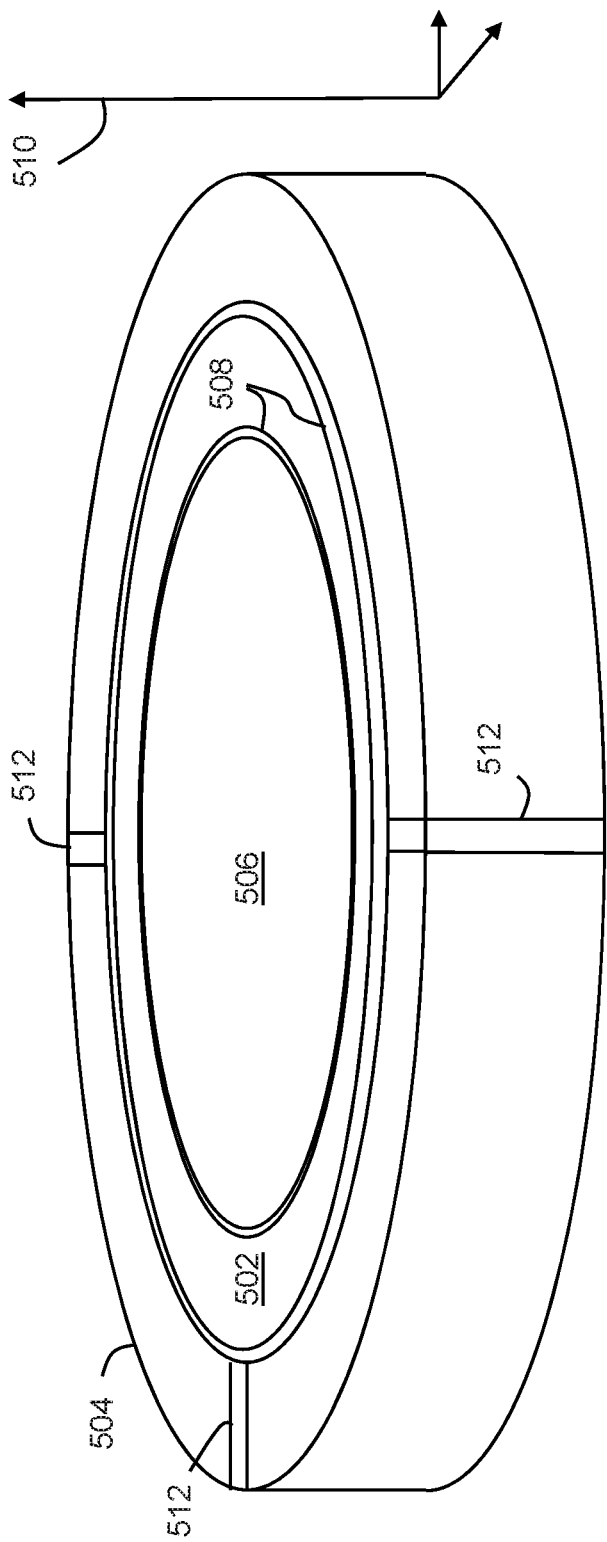
FIG. 5 illustrates an object and support that have been processed to remediate mold lock.

FIG. 5 illustrates an object and support that have been processed to remediate mold lock. In general, an object 502 such as a ring may be fabricated from a build material. Supports 504, 506, e.g., for a roof (not shown) to the object 502, may be fabricated adjacent to the object 502, and separated by an interface layer 508 to prevent bonding between the supports 504, 506 and the object 502 during sintering or other post-processing. By processing on a layer by layer basis along a vertical axis 510 as described herein, the outer support 504 may be separated in a number of locations by additional interface layers 512 to facilitate disassembly and horizontal removal of the outer support 504 after the object 502 and supports 504, 506 have been sintered into a final part.

Additionally, after a raft (not shown) below the object 502 has been removed, three-dimensional strategies may be applied to recognize that the central support 506 can be moved vertically (downward along the vertical axis 510) for removal from the interior of the object 502. In this manner, all of the surrounding supports 504, 506 for the object 502 may be easily removed, e.g., by hand, after the object 502 and the supports 504, 506 have been sintered or otherwise thermally processed into a final part such as one or more rigid, densified metallic components.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method for mitigating mold lock in an object to be fabricated, comprising:
    slicing a three-dimensional digital model for the object into a first horizontal two-dimensional profile corresponding to a horizontal object layer;
    slicing a three-dimensional digital model for a support structure corresponding to the object into a second horizontal two-dimensional profile corresponding to a horizontal support layer;
    identifying a draw path for separating the horizontal object layer from the horizontal support layer, the identifying including identifying a range of angles over which a rigid shape of the horizontal object layer can be separated in a straight line from a rigid shape of the horizontal support layer;
    identifying if a locked layer is present, the locked layer comprising one of:
        a non-existent draw path for separating one of the horizontal object layers from the horizontal support layers; or
        the first horizontal support layer being vertically coupled to a second horizontal support layer, with no draw path in common between the two layers;
    identifying, as a mold locked region, the locked layer and any vertically contiguous support layers;
    dividing the mold locked region with one or more vertical planes into one or more sub regions;
    if the one or more sub regions can be horizontally removed, processing a remaining digital model, excluding the one or more sub regions, for mold lock remediation; and
    if the one or more sub regions cannot be horizontally removed, remediating the mold locked region by subdividing the mold locked region into a number of volumetric sub regions, and searching for three-dimensional draw paths for removing the volumetric sub regions from the object.

2. The method of claim 1, wherein the identifying the draw path further comprises identifying the draw path on a layer-by-layer basis, within a plurality of layers in the digital model for the support structure and the object.

3. The method of claim 1, wherein the three-dimensional digital model includes a raft, the object being fabricated on the raft, and plurality of supports for fabrication with the object.

4. A method for removing geometrically interlocking parts in an object to be fabricated, comprising:
    slicing a three-dimensional digital model for the object into a first horizontal two-dimensional profile corresponding to a horizontal object layer;
    slicing a three-dimensional digital model for a support structure corresponding to the object into a second horizontal two-dimensional profile corresponding to a horizontal support layer;
    identifying a draw path for separating the horizontal object layer from the horizontal support layer;
    identifying if a locked layer is present, the locked layer comprising one of:
        a non-existent draw path for separating one of the horizontal object layers from the horizontal support layers; or
        the first horizontal support layer being vertically coupled to a second horizontal support layer, with no draw path in common between the two layers;
    identifying, as a mold locked region, the locked layer and any vertically contiguous support layers;
    dividing the mold locked region with one or more vertical planes into one or more subregions;
    if the one or more sub regions can be horizontally removed, processing a remaining digital model, excluding the one or more sub regions, for mold lock remediation; and
    if the one or more sub regions cannot be horizontally removed, employing one or more three-dimensional remediation strategies to address the mold locked region.

5. The method of claim 4, wherein the three-dimensional digital model includes a raft, the object being fabricated on the raft, and a plurality of supports for fabrication with the object.

6. The method of claim 5 further comprising performing an initial check to determine whether the object can be separated from the support and the raft along a vertical axis.

7. The method of claim 4 wherein dividing the mold locked region further comprises iteratively attempting an increasing number of planar slices until the one or more sub regions can be horizontally removed or a threshold is reached.

8. The method of claim 4 wherein the mold locked region is a first mold locked region, the method further comprising:
identifying a second mold locked region;
removing the second mold locked region from a vertically adjacent volume after fabrication; and
vertically moving the first mold locked region.

9. The method of claim 4 wherein the one or more three-dimensional remediation strategies includes:
subdividing the mold locked region into a number of volumetric sub regions; and
searching for three-dimensional draw paths for removing the volumetric sub regions from the object.

10. The method of claim 4 further comprising, if the one or more three-dimensional remediation strategies fail to remediate the mold lock, providing a notification that an unremediated mold lock condition exists.

11. The method of claim 4 further comprising fabricating the object and the support based on the digital model, the fabricating including fabricating the object includes fabricating an interface layer between the support and the object.

12. The method of claim 4, wherein the identifying the draw path further comprises identifying a linear path for uncoupling horizontal support from the horizontal object layer within a plane.

13. The method of claim 4, wherein the identifying the draw path further comprises testing for a linear separation the horizontal object layer from the horizontal support layer in a straight line.

14. A method for removing geometrically interlocking parts in an object to be fabricated, comprising:
slicing a three-dimensional digital model for the object into a first horizontal two-dimensional profile corresponding to a horizontal object layer;
slicing a three-dimensional digital model for a support structure corresponding to the object into a second horizontal two-dimensional profile corresponding to a horizontal support layer;
identifying a draw path for separating the horizontal object layer from the horizontal support layer;
identifying if a locked layer is present;
identifying, as a mold locked region, the locked layer and any vertically contiguous support layers;
dividing the mold locked region with one or more vertical planes into one or more sub regions;
employing a three-dimensional remediation strategy to address the mold locked region.

15. The method of claim 14,
if the one or more sub regions can be horizontally removed, processing a remaining digital model, excluding the one or more sub regions, for mold lock remediation; and
if the one or more sub regions cannot be horizontally removed, employing one or more three-dimensional remediation strategies to address the mold locked region.

16. The method of claim 14, wherein the three dimensional digital model includes a raft, the object for fabrication on the raft, and a plurality of supports for fabrication with the object.

17. The method of claim 14 further comprising performing an initial check to determine whether the object can be separated from the support structure along a vertical axis.

18. The method of claim 14 wherein dividing the mold locked region further comprises iteratively attempting an increasing number of planar slices until the one or more sub regions can be horizontally removed or a threshold is reached.

19. The method of claim 14 wherein the one or more three-dimensional remediation strategies includes vertically moving the mold locked region after fabrication after a second mold locked region is removed from a vertically adjacent volume after fabrication.

20. The method of claim 14 wherein the one or more three-dimensional remediation strategies includes subdividing the mold locked region into a number of volumetric sub regions and searching for three-dimensional draw paths for removing the volumetric sub regions from the object.

21. The method of claim 14 further comprising, if the one or more three-dimensional remediation strategies fail to remediate the mold lock, providing a notification that an unremediated mold lock condition exists.

* * * * *